(12) United States Patent
Popp

(10) Patent No.: US 6,332,386 B1
(45) Date of Patent: Dec. 25, 2001

(54) TRANSMISSION MECHANISM FOR SPINDLE HEAD OF FIVE-AXIS MACHINE TOOL

(75) Inventor: Konrad Joseph Popp, Augsburg (DE)

(73) Assignee: Industrial Technology Research Institute, Hsin Chu Hsien (TW)

( * ) Notice: Subject to any disclaimer, the term of this patent is extended or adjusted under 35 U.S.C. 154(b) by 0 days.

(21) Appl. No.: 09/501,986

(22) Filed: Feb. 11, 2000

(51) Int. Cl.7 .................. B23B 3/00; B23B 19/00
(52) U.S. Cl. .................. 82/142; 82/147; 82/145; 82/143
(58) Field of Search .................. 82/119, 96, 72, 82/140, 142, 143, 145, 147

(56) References Cited

U.S. PATENT DOCUMENTS

| | | | |
|---|---|---|---|
| 2,056,792 | * 10/1936 | Lovely | 29/46 |
| 2,161,545 | * 6/1939 | Groene et al. | 82/117 |
| 2,176,737 | * 10/1939 | Holmes | 82/143 |
| 2,239,443 | * 4/1941 | Groene et al. | 82/143 |
| 2,474,104 | * 6/1949 | Groene et al. | 74/640 |
| 3,216,287 | * 11/1965 | Pleger et al. | 408/124 |
| 3,725,987 | * 4/1973 | Kurimoto et al. | 29/27 C |
| 4,507,895 | * 4/1985 | Sakata et al. | 451/213 |
| 4,512,380 | * 4/1985 | Schmidt | 118/426 |
| 4,665,781 | * 5/1987 | Eichenhofer et al. | 82/129 |

* cited by examiner

Primary Examiner—Henry Tsai
(74) Attorney, Agent, or Firm—Rosenberg, Klein & Lee

(57) ABSTRACT

A transmission mechanism for spindle head of five-axis machine tool comprises three axes which are driven simultaneously. The transmission mechanism comprises a spindle transmission unit, a B-axis transmission unit and a C-axis transmission unit, and each transmission unit has a motor such that the rotary speed of the spindle is controlled by the two-speed change gear at top side thereof. The cutting unit below the spindle is driven by the spindle for processing. The transmission mechanism has knife replacing unit and blower to blow off dust when replacing knife. The B-axis transmission unit provides 115 degree swing through a gear set and a worm wheel. The C-axis transmission unit provides the dividing head with 360 degree rotation. Therefore, the B-axis transmission unit and the C-axis transmission unit provide the spindle with omni-directional rotation to process irregular curved surface.

5 Claims, 8 Drawing Sheets

TRANSMISSION MECHANISM FOR SPINDLE HEAD OF FIVE-AXIS MACHINE TOOL

FIELD OF THE INVENTION

The present invention relates to a transmission mechanism for spindle head of five-axis machine tool, particularly to a transmission mechanism, by which complicated-shape article can be easily processed and cutting dead-angle can be prevented.

BACKGROUND OF THE INVENTION

The five-axis machine tools are generally used to process a curved article such as aviation components and mold die. The five-axis machine tools have advantages of ability for processing complicated shape of the aviation components and processing the mold die with high efficiency. The five-axis machine tools can perform all required processing task on a single machine, thus providing high-efficiency processing and saving labor. The conventional five-axis machine tools use a horizontal machine main body and a rotatory station. Therefore, the volume and weight of the article to be processed are limited. Moreover, the spindle motor and the conduits for the spindle are arranged externally such that the swiveling angle is limited and the spindle head is bulky.

It is an object of the present invention to provide a transmission mechanism for spindle head of five-axis machine tool comprising three axes driven simultaneously, thus overcoming the drawback of the conventional five-axis machine tool using rotational station.

It is another object of the present invention to provide a transmission mechanism for spindle head of five-axis machine tool comprising three axes driven simultaneously, thus overcoming the drawback of the conventional five-axis machine tool with external spindle head conduit and limited rotational degree.

It is still another object of the present invention to provide a transmission mechanism for spindle head of five-axis machine tool comprising three axes driven simultaneously, thus overcoming the drawback of the conventional five-axis machine tool with external spindle head motor and bulky size.

The various objects and advantages of the present invention will be more readily understood from the following detailed description when read in conjunction with the appended drawing, in which:

DETAILED DESCRIPTION OF THE PREFERRED EMBODIMENT

Figure 1A:
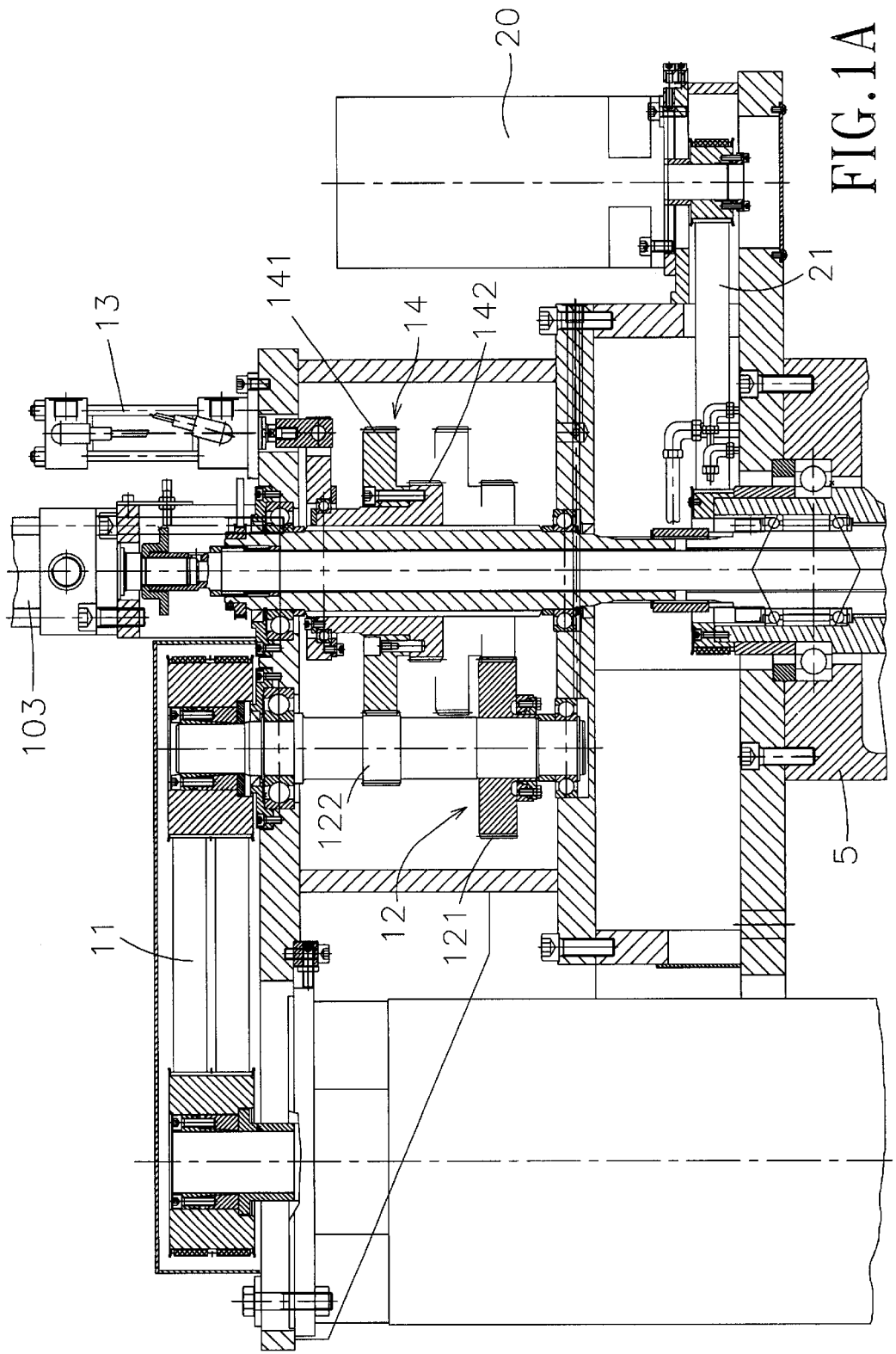
FIG. 1A is a top portion of the front section view of a preferred embodiment of the present invention.
Figure 1B:
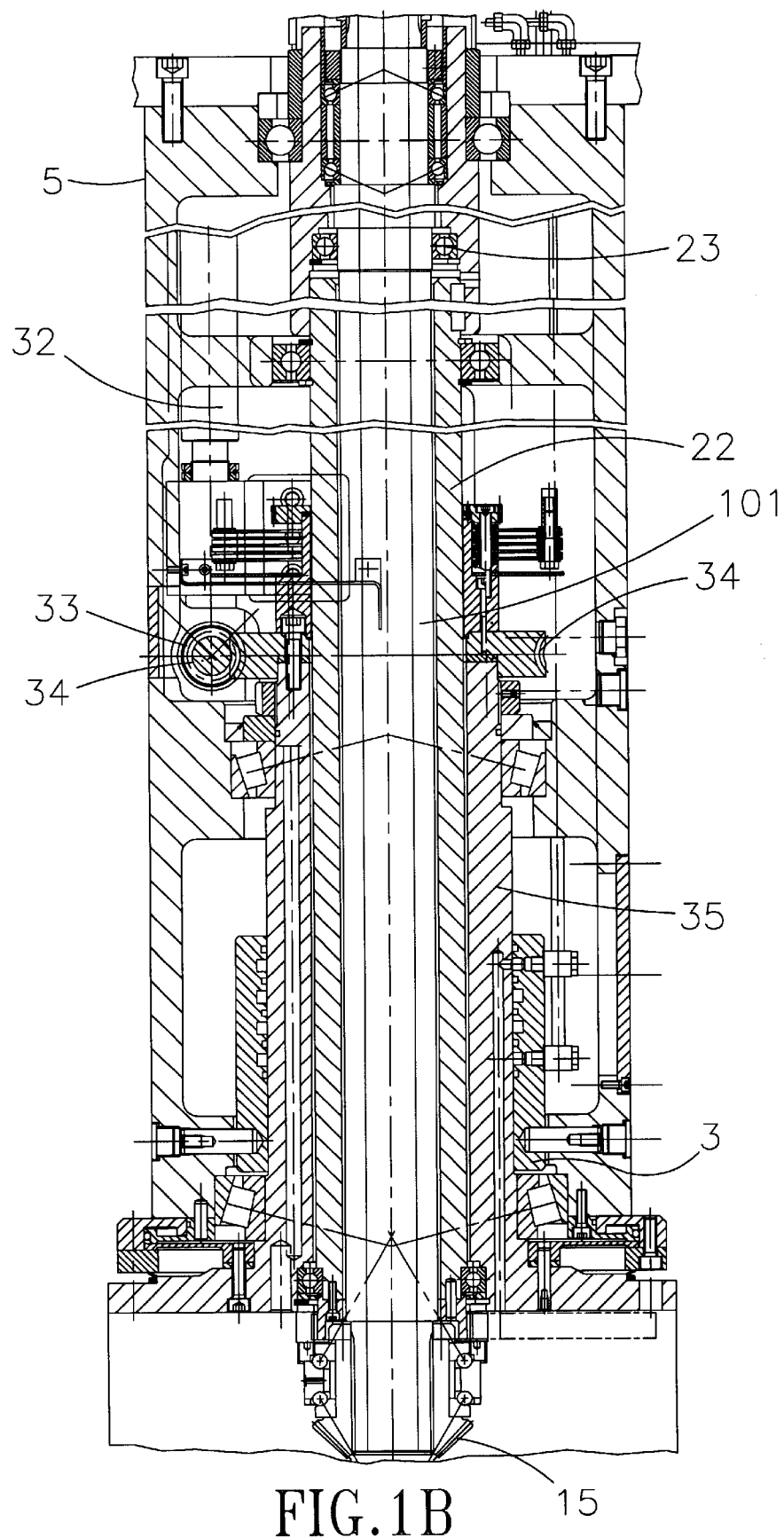
FIG. 1B is a middle portion of the front section view of a preferred embodiment of the present invention.
Figure 1C:
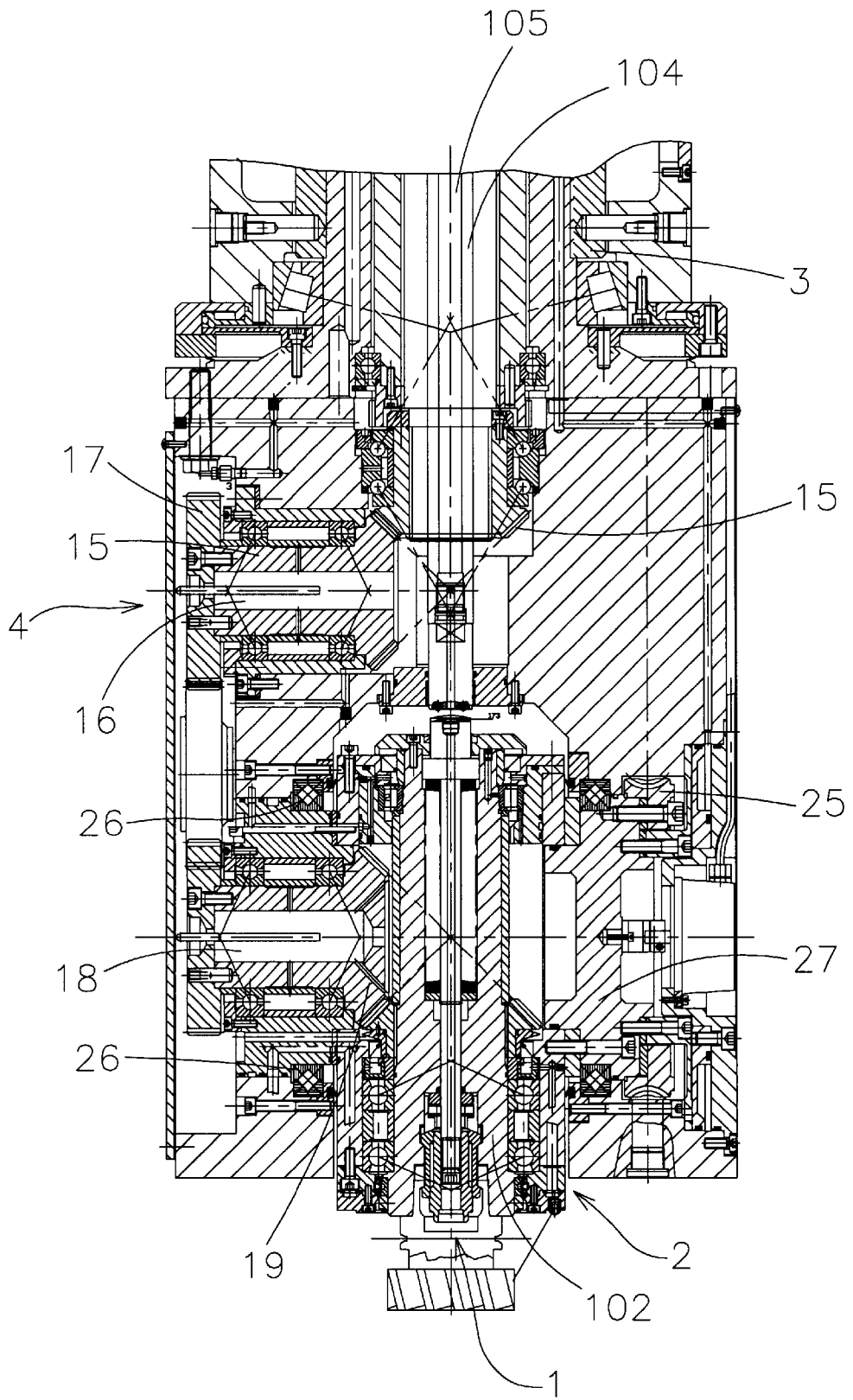
FIG. 1C is a bottom portion of the front section view of a preferred embodiment of the present invention.
Figure 2:
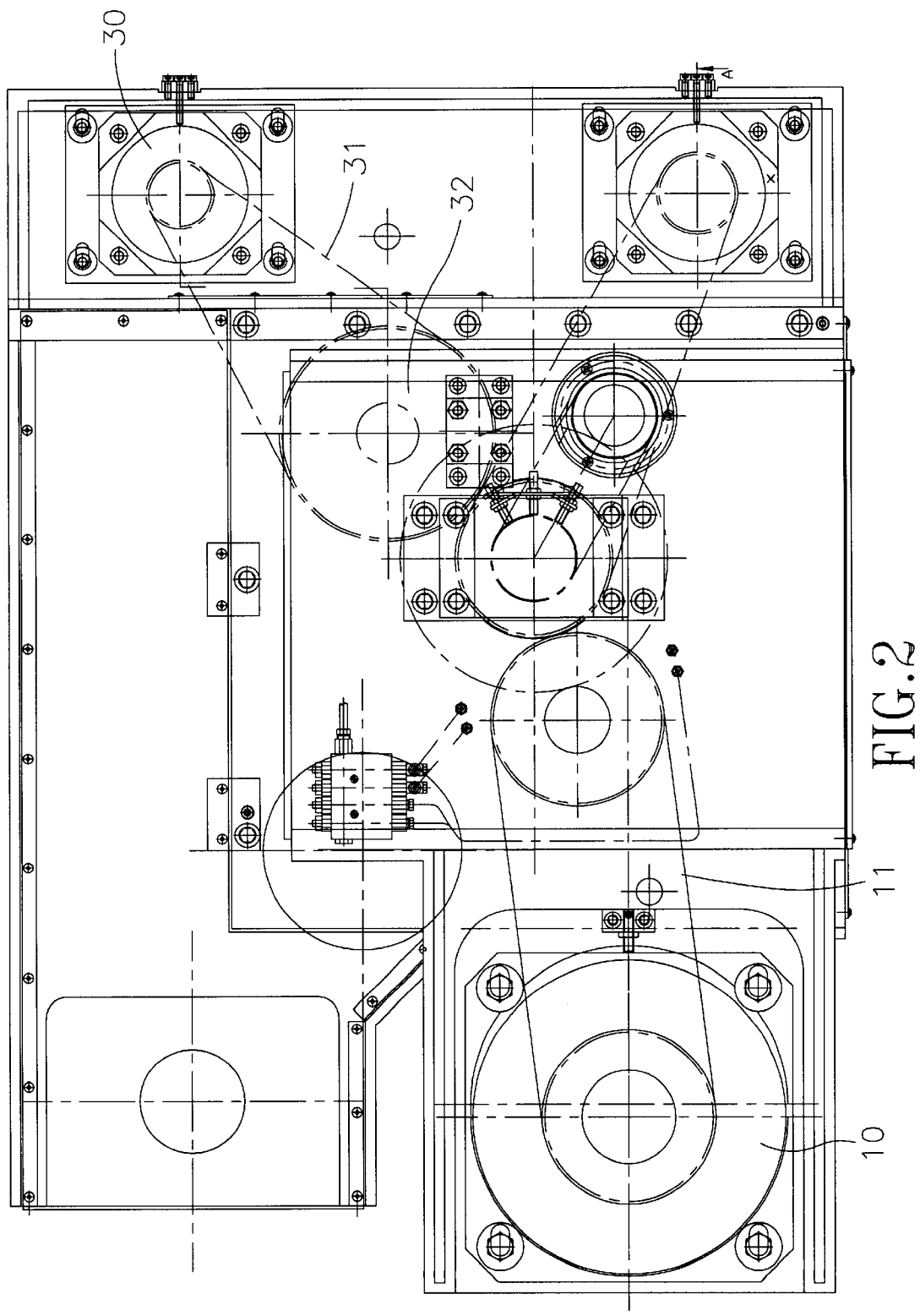
FIG. 2 is a top view of a preferred embodiment of the present invention.
Figure 3:
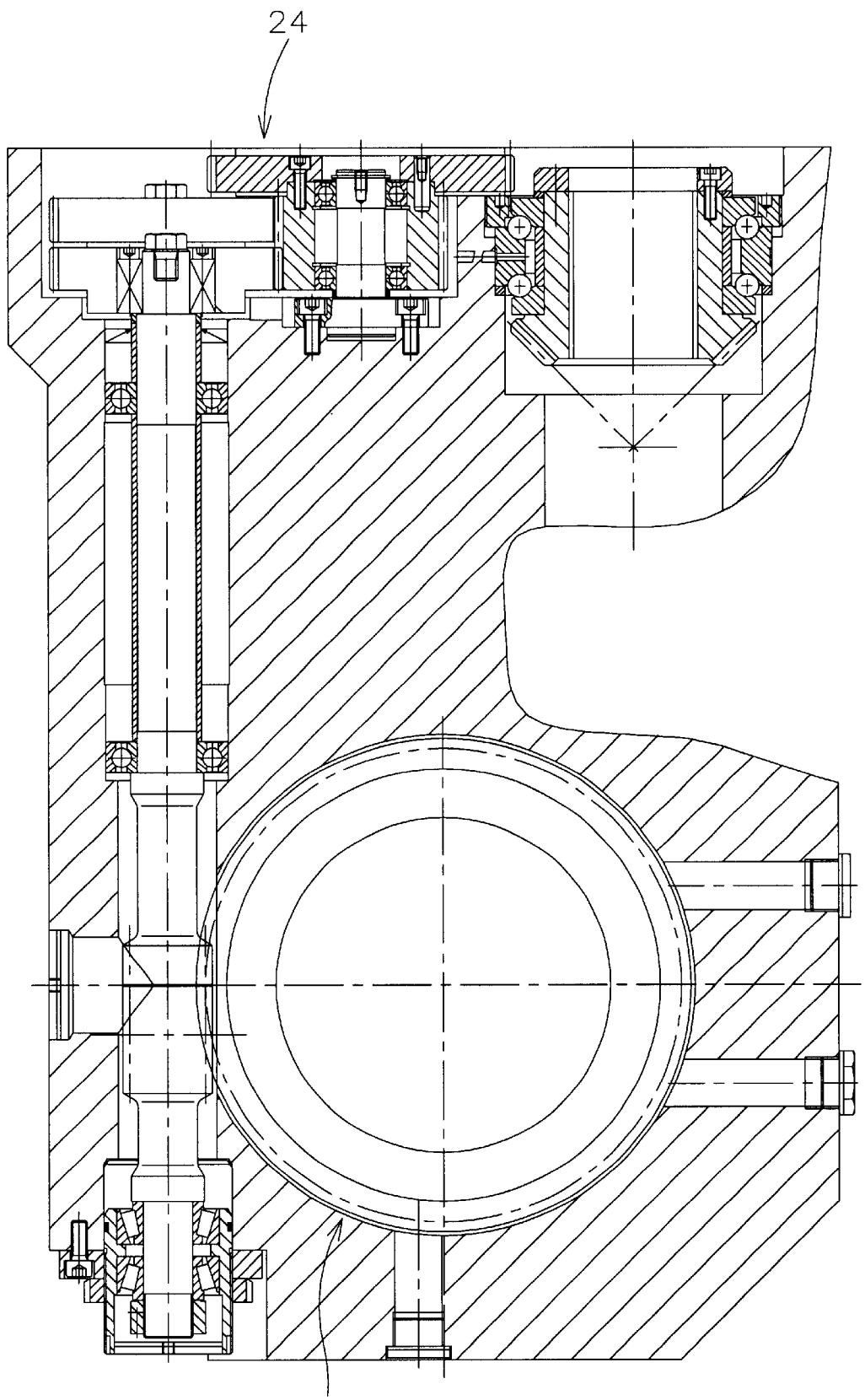
FIG. 3 is a sectional view of the B-axis transmission means of a preferred embodiment of the present invention.
Figure 4:
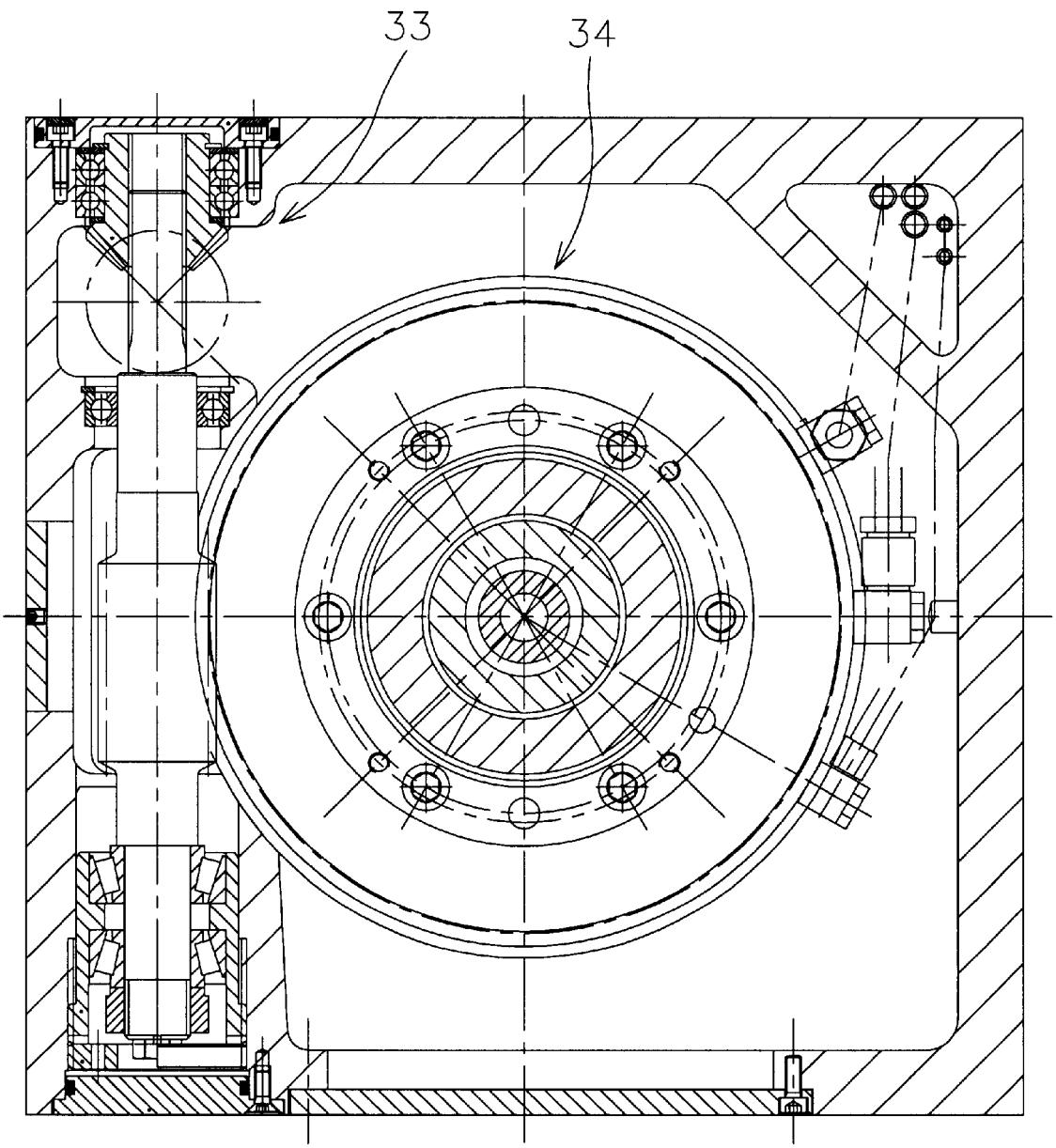
FIG. 4 is a sectional view of the C-axis transmission means of a preferred embodiment of the present invention.
Figure 5:
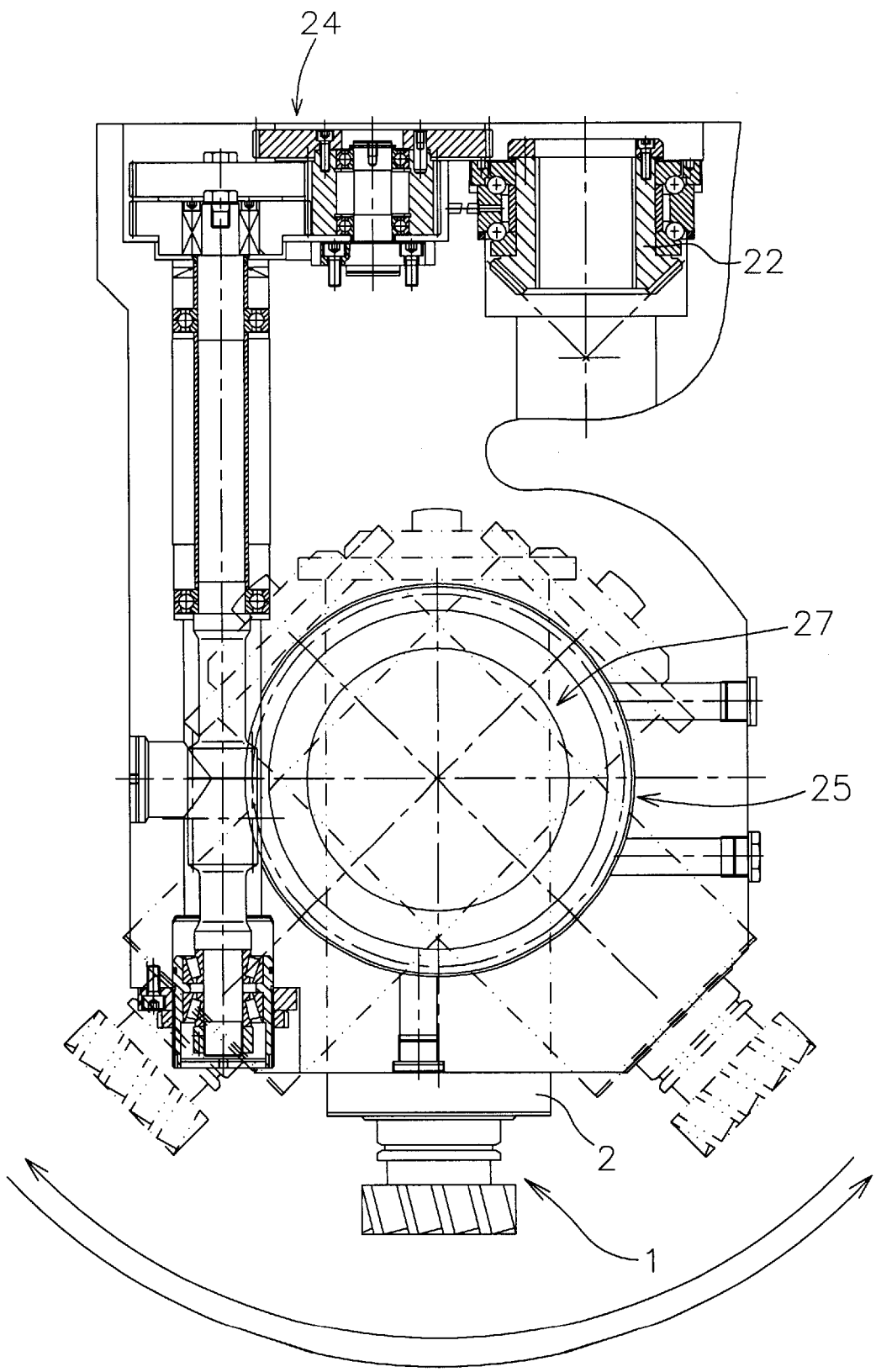
FIG. 5 is an illustrative schematic view of the portion of the preferred embodiment shown in FIG. 3; and, FIG. 6 is an illustrative schematic view of an isolated part of the view shown in FIG. 1C.

With reference to FIGS. 1 to 4, the present invention is intended to provide a transmission mechanism for spindle head of a five-axis machine tool. The transmission mechanism of spindle head of a five-axis machine tool according to the present invention comprises a spindle transmission means 1, a B-axis transmission means 2, a C-axis transmission means 3, a dividing head 4, and a spindle head 5. The spindle transmission means 1 comprises a first motor 10 fixed atop the spindle head 5. The first motor 10 is linked to a pulley set 11 and the pulley set 11 is linked to a change gear set 12. The change gear set 12 comprises a first gear 121 and a second gear 122. The spindle transmission means 1 further comprises a pneumatic cylinder 13 fixed atop the spindle head 5. The pneumatic cylinder 13 is linked to a translational gear set 14, which has a third gear 141 and a fourth gear 142. The translational gear set 14 is moved upward and downward by the pneumatic cylinder 13 such that the third gear 141 and the fourth gear 142 are selectively engaged with the first gear 121 and the second gear 122, thus forming a two-speed change gear set. The translational gear set 14 is linked to a spindle transmission shaft 101 whereby the spindle transmission shaft 101 is rotated by the translational gear set 14. The spindle transmission shaft 101 is linked to a skew bevel gear set 15 on the bottom side thereof and linked to a transmission shaft 16. The rotation motion of the spindle transmission shaft 101 transmits horizontally, through the skew bevel gear set 15 and the transmission shaft 16, to the lateral edge of the dividing head 4. The transmission shaft 16 is linked to a male gear set 17, which is vertically linked to a skew bevel gear set 19 through a connection rod 18. The skew bevel gear set 19 is linked to a center shaft 102 such that the center shaft 102 below the spindle is driven by the skew bevel gear set 19 to rotate the knife for cutting. A pneumatic cylinder 103 is provided atop the spindle head 5 and linked to a knife-replacing means 104 such that the knife-replacing means 104 is driven by the pneumatic cylinder 103 to replace cutting knife. The spindle transmission shaft 101 is provided with a blower 105 at center thereof to blow off impurity when replacing knife.

Figure 6:
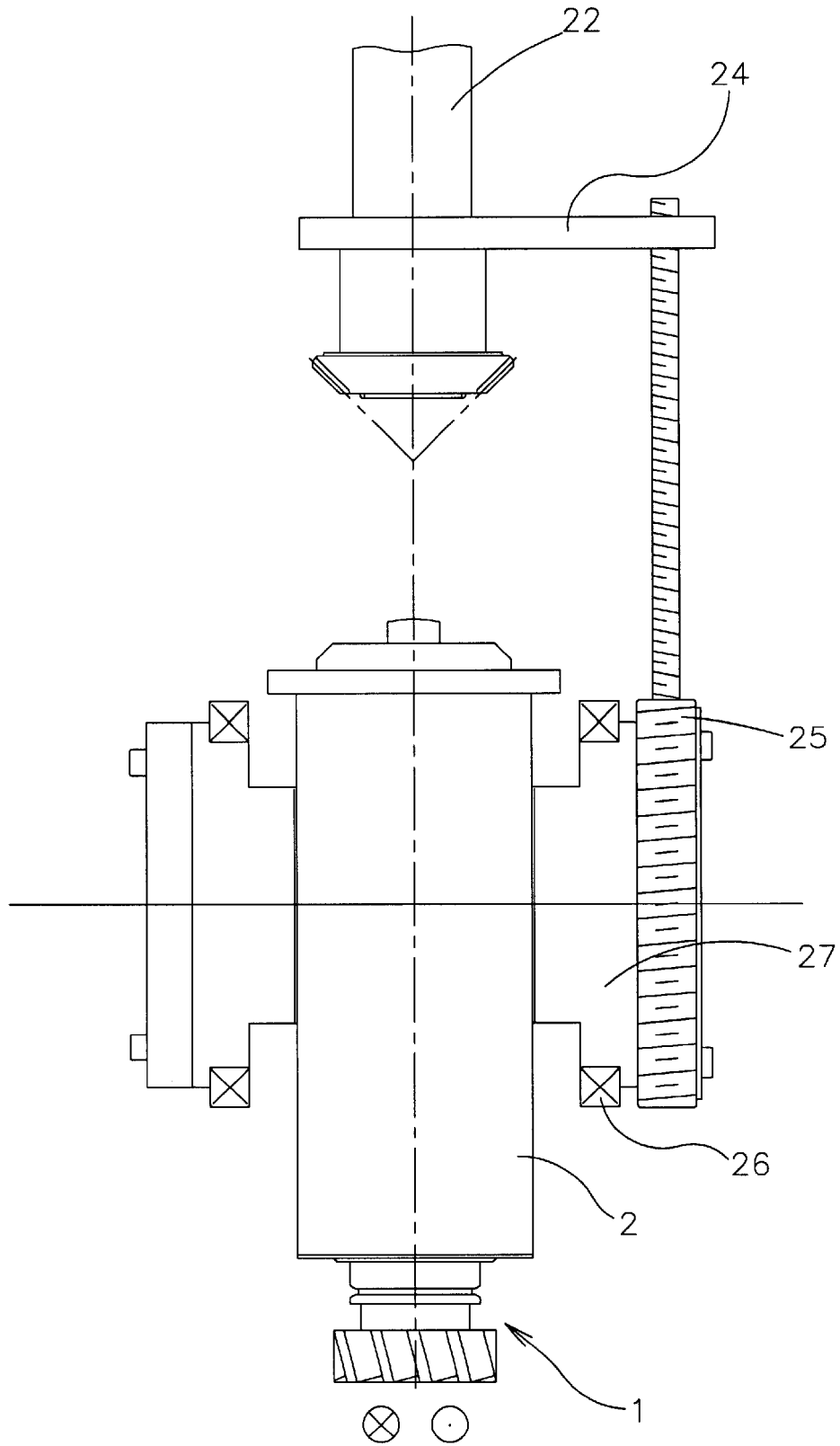

The B-axis transmission means 2 comprises a second motor 20 fixed atop the spindle head 5 and linked to a pulley set 21. The pulley set 21 is linked to a B-axis transmission shaft 22 enclosing the spindle transmission shaft 101. The second motor 20 drives the B-axis transmission shaft 22 through the pulley set 21. The spindle transmission shaft 101 is spaced from the B-axis transmission shaft 22 by a bearing 23 such that the rotation of the spindle transmission shaft 101 is not influenced by the B-axis transmission shaft 22. A gear set 24 is arranged below the B-axis transmission shaft 22 through which the B-axis transmission shaft 22 is linked to a worm wheel 25 below the dividing head 4 as shown more clearly in FIG. 6. The B-axis transmission shaft 22 is supported by a bi-directional bearing 26 on four lower corners thereof. The B-axis The C-axis transmission means 3 comprises a third motor 30 fixed atop the spindle head 5 and linked to a pulley set 31. The pulley set 31 is linked to a rotary shaft 32. The third motor 30 drives the rotary shaft 32 through the pulley set 31. The rotary shaft 32 is also linked to a skew bevel gear set 33 to change force transmission direction. The skew bevel gear set 33 is linked to a worm wheel 34 such that the C-axis transmission rod 35 locked below the worm wheel 34 is driven when the rotary shaft 32 rotates. The C-axis transmission rod 35 is arranged outside the B-axis transmission shaft 22 and will not influence the rotation of the B-axis transmission shaft 22. Moreover, the C-axis transmission rod 35 is locked with the dividing head 4 such that the C-axis transmission rod 35 can drive the dividing head 4 to rotate 360 degree.

In the present invention, the dividing head 4 is driven by the B-axis transmission means 2 and the C-axis transmission means 3 to swing 115 degree and to rotate 360 degree, respectively. Therefore the spindle of the present invention can perform processing for article of complicated shape without dead angle. Moreover, the transmission means 1, 2 and 3, are provided with braking system (not shown), therefore, the B-axis and C-axis can perform cutting at a specific angle, and the precision of cutting will not be influenced by the swing of B-axis and the rotation of C-axis when the spindle performs cutting again.

To sum up, the transmission mechanism for spindle head of five-axis machine tool according to the present invention has following advantages:

1. The spindle, B-axis, and C-axis are arranged within the spindle head and drive simultaneously. The three axes, in conjunction with two feeding axes of a planer, form a five-axis machine tool. The five-axis machine tool can perform complicated processing such as airplane wing without dead angle.
2. The three motors 10, 20 and 30 are arranged atop the spindle head 5, the rotation degree of the spindle head 5 is not limited. The spindle head 5 has compact size.
3. The rotation speed of the spindle is controlled by the two-speed change gear set 12 and the force of the spindle is transmitted to the cutting means on bottom thereof. The spindle is provided with knife replacing means and blower. Therefore, the knife can be automatically changed and the impurity can be blown off when replacing knife.
4. The B-axis transmission means 2 of the present invention is driven by the motor 20 atop the spindle 5 and then drives the B-axis on bottom thereof through a worm wheel 25. Therefore, the B-axis transmission means 2 provides 115 degree swing for cutting operation of the spindle.
5. The C-axis transmission means 3 of the present invention is driven by the motor 30 atop the spindle 5 and then drives the C-axis on bottom thereof through a worm wheel 34. Therefore, the C-axis transmission means 3 provides 360 degree rotation for cutting operation of the spindle.
6. The present invention provide omni-directional processing for irregular surface. The process can be done in one time to save time.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

I claim:

1. A transmission mechanism for a spindle head of a five-axis machine tool, comprising:

a spindle head;

a dividing head arranged below the spindle head;

a spindle transmission mechanism having a first motor fixed atop the spindle head and linked to a spindle transmission shaft through a pulley and a change gear; the spindle transmission shaft driving through a gear set a center shaft below a spindle to rotate about a first axis to thereby perform a cutting operation;

a B-axis transmission mechanism having a second motor fixed atop the spindle head and linked to a B-axis transmission shaft enclosing the spindle transmission shaft through a pulley; the B-axis transmission shaft being linked through a gear set to a first worm wheel below the dividing head; the B-axis transmission shaft driving the B-axis transmission mechanism through the gear set and first worm wheel to displace pivotally about a second axis transversely oriented relative to the first axis; and, a C-axis transmission mechanism having a third motor fixed atop the spindle head and linked to a rotary shaft through a pulley; the rotary shaft being linked with a gear set and locked to a C-axis transmission rod therebelow; the C-axis transmission rod housing the B-axis transmission shaft; the C-axis transmission rod being locked with the dividing head to drive the dividing head to displace angularly about a third axis transversely oriented relative to the first axis within an angular range of 360 degrees.

2. The transmission mechanism for a spindle head of a five-axis machine tool as in claim 1, wherein the spindle transmission mechanism further comprises a pneumatic cylinder linked with a knife replacing means; the pneumatic cylinder driving the knife replacing means to replace a knife; and the spindle transmission shaft further comprising a blower to blow off impurities during knife replacement.

3. The transmission mechanism for a spindle head of a five-axis machine tool as in claim 1, wherein the spindle transmission shaft of the spindle transmission mechanism is linked to a transmission shaft through a skew bevel gear set on a bottom side thereof; the transmission shaft being linked to another skew bevel gear set through a male gear and a connection rod, thus driving the center shaft below the spindle.

4. The transmission mechanism for a spindle head of a five-axis machine tool as in claim 1, wherein the B-axis transmission shaft of the B-axis transmission mechanism is supported by a bi-directional bearing on four lower sides thereof.

5. The transmission mechanism for a spindle head of a five-axis machine tool as in claim 1, wherein the rotary shaft of the C-axis transmission mechanism is linked to a skew bevel gear set and a second worm wheel; the second worm wheel being locked to the C-axis transmission rod on lower side thereof.

* * * * *